(12) United States Patent
Tripathi

(10) Patent No.: US 12,115,481 B2
(45) Date of Patent: Oct. 15, 2024

(54) FILTER ASSEMBLY INCLUDING A REMOVABLE OUTLET CONDUIT

(71) Applicant: Cummins Filtration IP, Inc., Columbus, IN (US)

(72) Inventor: Narendra Kumar Tripathi, Pune (IN)

(73) Assignee: Cummins Filtration IP, Inc., Columbus, IN (US)

( * ) Notice: Subject to any disclaimer, the term of this patent is extended or adjusted under 35 U.S.C. 154(b) by 660 days.

(21) Appl. No.: 17/058,345

(22) PCT Filed: May 23, 2019

(86) PCT No.: PCT/US2019/033759
§ 371 (c)(1),
(2) Date: Nov. 24, 2020

(87) PCT Pub. No.: WO2019/231820
PCT Pub. Date: Dec. 5, 2019

(65) Prior Publication Data
US 2021/0086118 A1    Mar. 25, 2021

(30) Foreign Application Priority Data

May 31, 2018 (IN) .............................. 201841020376

(51) Int. Cl.
*B01D 46/00* (2022.01)
*B01D 46/24* (2006.01)
(Continued)

(52) U.S. Cl.
CPC ..... *B01D 46/0004* (2013.01); *B01D 46/0046* (2013.01); *B01D 46/2414* (2013.01);
(Continued)

(58) Field of Classification Search
None
See application file for complete search history.

(56) References Cited

U.S. PATENT DOCUMENTS

| 3,350,856 A | 11/1967 | Revell |
| 3,636,681 A | 1/1972 | Batson |

(Continued)

FOREIGN PATENT DOCUMENTS

| CN | 201301768 Y | 9/2009 |
| CN | 201823409 U | 5/2011 |

(Continued)

OTHER PUBLICATIONS

Foriegn documents may be listed as NPL.*

(Continued)

*Primary Examiner* — Brit E. Anbacht
(74) *Attorney, Agent, or Firm* — Foley & Lardner LLP

(57) ABSTRACT

A filter assembly comprises a housing defining an internal volume. The housing defines an outlet. A housing ledge extends radially inwards from a rim of the outlet. An outlet conduit comprises an outlet elbow, and an outlet tube extending axially from the outlet elbow towards the housing. The outlet tube is positioned within the housing. A rib extends radially from an outer surface of the outlet tube proximate to the outlet elbow. The rib engages the housing ledge so as to couple the outlet conduit to the housing. A filter element is also positioned within the housing.

15 Claims, 13 Drawing Sheets

(51) Int. Cl.
   *B01D 46/64*   (2022.01)
   *F02M 37/32*   (2019.01)
(52) U.S. Cl.
   CPC ........ *B01D 46/64* (2022.01); *B01D 2265/028*
   (2013.01); *B01D 2271/022* (2013.01); *B01D*
   *2279/60* (2013.01); *F02M 37/32* (2019.01)

(56) References Cited

U.S. PATENT DOCUMENTS

| | | | |
|---|---|---|---|
| 3,668,842 A | | 6/1972 | Batson |
| 4,141,700 A | | 2/1979 | Norton et al. |
| 4,698,985 A | | 10/1987 | Wintersteen |
| 4,967,443 A | | 11/1990 | Krasznai et al. |
| 5,167,677 A | | 12/1992 | Hammes |
| 5,693,109 A | * | 12/1997 | Coulonvaux .......... B01D 46/88 |
| | | | 55/498 |
| 5,730,769 A | | 3/1998 | Dungs et al. |
| 5,755,844 A | * | 5/1998 | Arai ..................... F02M 35/024 |
| | | | 55/498 |
| 5,800,581 A | * | 9/1998 | Gielink ................ B01D 46/62 |
| | | | 55/498 |
| 5,803,939 A | | 9/1998 | Huning |
| 5,846,302 A | | 12/1998 | Putro |
| 5,865,863 A | * | 2/1999 | DeSousa ............ F02M 35/0203 |
| | | | 55/497 |
| 5,897,676 A | | 4/1999 | Engel et al. |
| 6,039,778 A | * | 3/2000 | Coulonvaux ...... F02M 35/0203 |
| | | | 55/504 |
| 6,105,576 A | | 8/2000 | Clawson et al. |
| 6,167,862 B1 | * | 1/2001 | Powell ............... F02M 35/1036 |
| | | | 123/198 E |
| 6,261,445 B1 | | 7/2001 | Singleton |
| 6,299,661 B1 | * | 10/2001 | Bloomer ............ F02M 35/1038 |
| | | | 55/498 |
| 6,569,219 B1 | * | 5/2003 | Connor .............. B01D 46/2414 |
| | | | 55/497 |
| 6,685,829 B1 | | 2/2004 | Baumann et al. |
| 6,723,148 B2 | | 4/2004 | Stass |
| 6,752,846 B2 | | 6/2004 | Rotter et al. |
| 6,797,042 B2 | | 9/2004 | Laferriere et al. |
| 6,866,694 B2 | | 3/2005 | Moreau |
| 7,128,771 B2 | | 10/2006 | Harden |
| 7,311,748 B2 | | 12/2007 | Holmes et al. |
| 7,413,588 B2 | | 8/2008 | Holzmann et al. |
| 7,597,735 B2 | | 10/2009 | Terres et al. |
| 7,662,283 B2 | | 2/2010 | Eserkaln et al. |
| 7,815,705 B2 | | 10/2010 | Ehrenberg |
| 7,828,870 B1 | | 11/2010 | Rech et al. |
| 7,867,311 B1 | | 1/2011 | Connor et al. |
| 7,935,160 B2 | | 5/2011 | Holzmann et al. |
| 7,959,714 B2 | | 6/2011 | Smith et al. |
| 8,016,922 B2 | | 9/2011 | Ehrenberg |
| 8,268,170 B2 | | 9/2012 | Core et al. |
| 8,287,614 B2 | | 10/2012 | Gillispie et al. |
| 8,424,153 B2 | | 4/2013 | Fester et al. |
| 8,495,788 B2 | | 7/2013 | Tran |
| 8,551,206 B2 | | 10/2013 | Cosgrove |
| 8,784,522 B2 | | 7/2014 | Menssen et al. |
| 8,858,793 B2 | | 10/2014 | Roesgen |
| 9,586,166 B2 | * | 3/2017 | Coulonvaux ...... B01D 46/0005 |
| 11,460,481 B2 | * | 10/2022 | Wiseman ............ G01P 13/0013 |
| 2003/0051453 A1 | | 3/2003 | Moreau et al. |
| 2003/0188520 A1 | | 10/2003 | Boulva |
| 2003/0217534 A1 | * | 11/2003 | Krisko .................. B01D 50/20 |
| | | | 55/482 |
| 2005/0193695 A1 | | 9/2005 | Holmes et al. |
| 2007/0084170 A1 | | 4/2007 | Ehrenberg |
| 2008/0148695 A1 | | 6/2008 | Terres et al. |
| 2008/0184685 A1 | | 8/2008 | Kempf et al. |
| 2008/0203614 A1 | | 8/2008 | Holzmann et al. |
| 2008/0276582 A1 | | 11/2008 | Boehrs et al. |
| 2009/0007528 A1 | | 1/2009 | Wilson |
| 2009/0126324 A1 | | 5/2009 | Smith et al. |
| 2009/0236271 A1 | | 9/2009 | Eserkaln et al. |
| 2009/0236272 A1 | | 9/2009 | Zerger et al. |
| 2009/0236276 A1 | | 9/2009 | Kurth et al. |
| 2009/0236277 A1 | | 9/2009 | Kurth et al. |
| 2010/0000190 A1 | | 1/2010 | Kidman |
| 2010/0064646 A1 | * | 3/2010 | Smith ................ B01D 46/0005 |
| | | | 55/501 |
| 2010/0126131 A1 | | 5/2010 | Scott et al. |
| 2010/0236014 A1 | | 9/2010 | Inc |
| 2010/0236016 A1 | | 9/2010 | Tran |
| 2010/0236205 A1 | | 9/2010 | Braithwaite et al. |
| 2011/0016699 A1 | | 1/2011 | Ehrenberg |
| 2011/0030322 A1 | | 2/2011 | Gillispie et al. |
| 2011/0147297 A1 | | 6/2011 | Core et al. |
| 2011/0283669 A1 | | 11/2011 | Scott et al. |
| 2011/0296999 A1 | | 12/2011 | Foerster et al. |
| 2012/0168366 A1 | | 7/2012 | Holker et al. |
| 2012/0291409 A1 | | 11/2012 | Cosgrove |
| 2013/0075319 A1 | | 3/2013 | Roesgen |
| 2013/0186048 A1 | | 7/2013 | Muenkel |
| 2013/0269302 A1 | | 10/2013 | Scott et al. |
| 2013/0327005 A1 | | 12/2013 | Menssen et al. |
| 2015/0020487 A1 | | 1/2015 | Scott et al. |
| 2016/0090947 A1 | | 3/2016 | Tomlin et al. |
| 2016/0114275 A1 | | 4/2016 | Schwartz et al. |
| 2016/0243483 A1 | | 8/2016 | Hartley et al. |
| 2016/0271546 A1 | | 9/2016 | Scott et al. |
| 2016/0332095 A1 | | 11/2016 | Abdalla et al. |
| 2016/0375391 A1 | * | 12/2016 | Adamek ............ B01D 46/4227 |
| | | | 55/493 |
| 2017/0095761 A1 | | 4/2017 | Knight et al. |
| 2017/0234278 A1 | | 8/2017 | Jasnie et al. |
| 2017/0246571 A1 | * | 8/2017 | Adamek ................ B01D 46/62 |
| 2017/0291129 A1 | | 10/2017 | Sorger |

FOREIGN PATENT DOCUMENTS

| | | | | |
|---|---|---|---|---|
| CN | | 101811113 B | 5/2012 | |
| CN | | 202284849 U | 6/2012 | |
| CN | | 203154983 U | 8/2013 | |
| CN | | 103826718 B | 5/2014 | |
| CN | | 203790746 U | 8/2014 | |
| CN | | 204035337 U | 12/2014 | |
| CN | | 204035339 U | 12/2014 | |
| CN | | 204279043 U | 4/2015 | |
| CN | | 104712861 A | 6/2015 | |
| CN | | 103934618 B | 3/2016 | |
| CN | | 205606860 U | 9/2016 | |
| CN | | 106091197 A | 11/2016 | |
| CN | | 105268838 B | 3/2017 | |
| CN | | 104526989 B | 7/2017 | |
| CN | | 206372619 U | 8/2017 | |
| CN | | 107435576 A | 12/2017 | |
| CN | | 105545551 A | 5/2019 | |
| DE | | 19623078 A1 | 11/1998 | |
| DE | 10 2005 031 501 A1 | | 1/2007 | |
| DE | | 19963088 B4 | 2/2014 | |
| DE | | 102016004315 A1 * | 10/2017 | ........ B01D 29/213 |
| EP | | 0 991 459 | 4/2000 | |
| EP | | 0 951 335 B1 | 5/2003 | |
| EP | | 1 771 237 B1 | 11/2010 | |
| EP | | 3 003 533 A2 | 4/2016 | |
| GB | | 0 272 544 A | 9/1927 | |
| GB | | 1 103 752 A | 2/1968 | |
| GB | | 1 104 643 A | 2/1968 | |
| GB | | 1 162 094 A | 8/1969 | |
| GB | | 1 490 019 A | 10/1977 | |
| JP | | H11-237116 A | 8/1999 | |
| JP | | 2003-326123 A | 11/2003 | |
| JP | | 2009-291771 A | 12/2009 | |
| JP | | 2019509884 A * | 4/2019 | |
| KR | | 20040057985 A | 7/2004 | |
| KR | | 20130102856 A | 9/2013 | |
| WO | | WO-98/20961 A1 | 5/1998 | |
| WO | | WO-99/00174 A1 | 1/1999 | |

(56) References Cited

FOREIGN PATENT DOCUMENTS

WO    WO-2014/197698       12/2014
WO    WO-2017/053177 A1    3/2017

OTHER PUBLICATIONS

International Search Report and Written Opinion issued for PCT Application No. PCT/US2019/033759, issued Aug. 12, 2019, 14 pages.
First Office Action issued for Indian Patent Application No. 202047049248, issued May 11, 2021, 6 pages.
First Office Action issued for Chinese Patent Publicaiton No. CN 201980033312.3 issued Aug. 26, 2021, 8 pages.

* cited by examiner

FILTER ASSEMBLY INCLUDING A REMOVABLE OUTLET CONDUIT

CROSS-REFERENCE TO RELATED APPLICATIONS

The present application is a national stage of PCT Application No. PCT/US2019/033759, filed May 23, 2019, which claims priority to and benefit of Indian Provisional Patent App. No. 201841020376, filed May 31, 2018 and entitled "Filter Assembly Including a Removable Outlet Conduit." The contents of these applications are hereby incorporated by reference in their entirety.

TECHNICAL FIELD

The present disclosure relates generally to a filtration apparatus for filtering fluids.

BACKGROUND

Internal combustion engines generally combust a mixture of fuel (e.g., diesel, gasoline, natural gas, etc.) and air. Prior to entering the engine, the fuel is typically passed through a filter element to remove particulate matter (e.g., dust, metal particles, debris, etc.) from the fuel prior to combustion. For example, air used to produce an air/fuel mixture may be passed through a filter assembly including a filter element for removing particles (e.g., dust, debris, carbon, soot, etc.), before providing to a fuel injection system. Such filter elements are generally used in filter assemblies that may include a housing in which the filter element is inserted. Conventional filter assemblies often do not prevent use of a counterfeit or unauthorized filter element in the filter assembly. This may lead to reduced filtration efficiency and increased maintenance costs.

SUMMARY

Embodiments described herein relate generally to filter assemblies including housings defining an outlet, and an outlet tube positioned through the outlet. The outlet tube may be elliptical in shape but includes a circular rib that snap-fits onto a ledge defined in a circular opening of the housing for coupling the outlet tube thereto. Other embodiments relate to lugs defined in a roof of the housing configured to be inserted into corresponding slots defined in an end cap of a filter element so as to facilitate alignment, as well as prevent non-genuine filter elements from being inserted into and used with the housing.

In some embodiments, a filter assembly comprises a housing defining an internal volume. The housing defines an outlet. A housing ledge extends radially inwards from a rim of the outlet. An outlet conduit comprises an outlet elbow, and an outlet tube extending axially from the outlet elbow towards the housing. The outlet tube is positioned within the housing. A rib extends radially from an outer surface of the outlet tube proximate to the outlet elbow. The rib engages the housing ledge so as to couple the outlet conduit to the housing. A filter element is positioned within the housing.

In another set of embodiments, a filter element comprises a filter media defining an axial channel therethrough. A first end cap is coupled to a first end of the filter media, the first end cap defining a first end cap opening. The first end cap opening defines a first non-circular shape structured to receive an outlet tube of an outlet conduit defining a second non-circular cross-sectional shape corresponding to the first non-circular shape.

In still another set of embodiments, an outlet conduit for a filter assembly that comprises housing defining an outlet in a roof thereof, a filter element disposed in the housing that filter element including a filter media and an end cap coupled to a first end of the filter media proximate to the roof the first end cap that defines a first end cap opening, comprises an outlet elbow configured to extend away from the housing. An outlet tube extends axially away from the outlet elbow. The outlet tube is configured to extend into the first end cap opening so as to be in fluid communication with the axial channel. A rib extends radially from an outer surface of the outlet tube proximate to the outlet elbow, the rib configured to engage the housing ledge so as to couple the outlet conduit to the housing.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
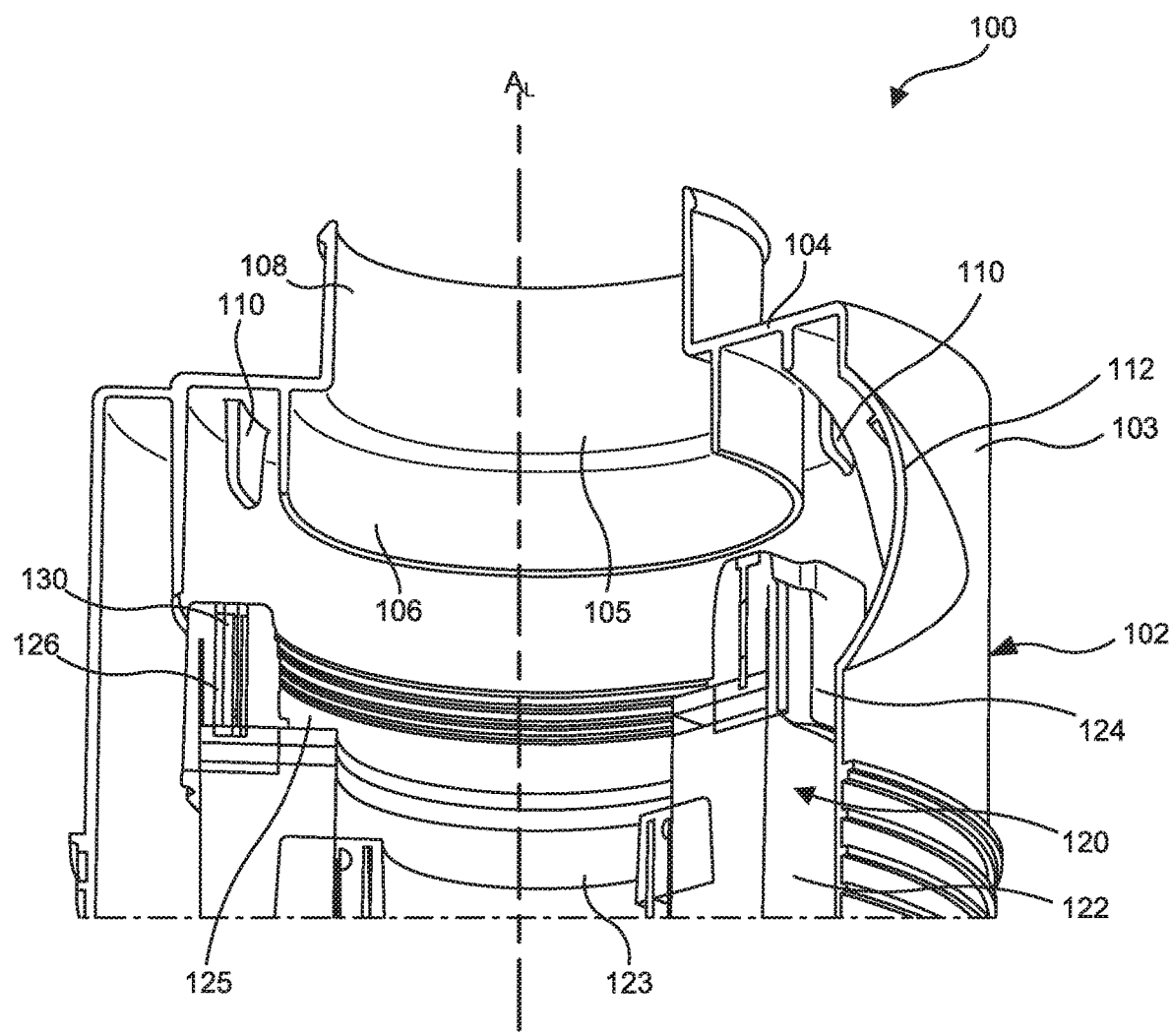
FIG. 1 is a side cross-sectional view of a portion of a filter assembly, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to filter assemblies including housings defining an outlet, and an outlet tube positioned through the outlet. The outlet tube may be elliptical in shape but includes a circular rib that snap-fits onto a ledge defined in a circular opening of the housing for coupling the outlet tube thereto. Other embodiments relate to lugs defined in a roof of the housing configured to be inserted into corresponding slots defined in an end cap of a filter element to facilitate alignment as well as prevent counterfeit filter elements from being inserted into and used with the housing.

Embodiments of the filter assembly described herein may provide one or more benefits including, for example: (1) preventing insertion of a counterfeit filter into a housing of a filter assembly by providing lugs on the housing that correspond to slots formed in a genuine filter element; (2) providing an elliptical outlet tube configured to interface with a genuine filter element defining a corresponding elliptical opening, thereby providing further protection against use of a counterfeit filter element with the filter assembly; and (3) providing a circular rib around the elliptical outlet tube, thereby allowing orientation of the outlet tube at any suitable radial angle with respect to an outlet of the housing.

Figure 2:
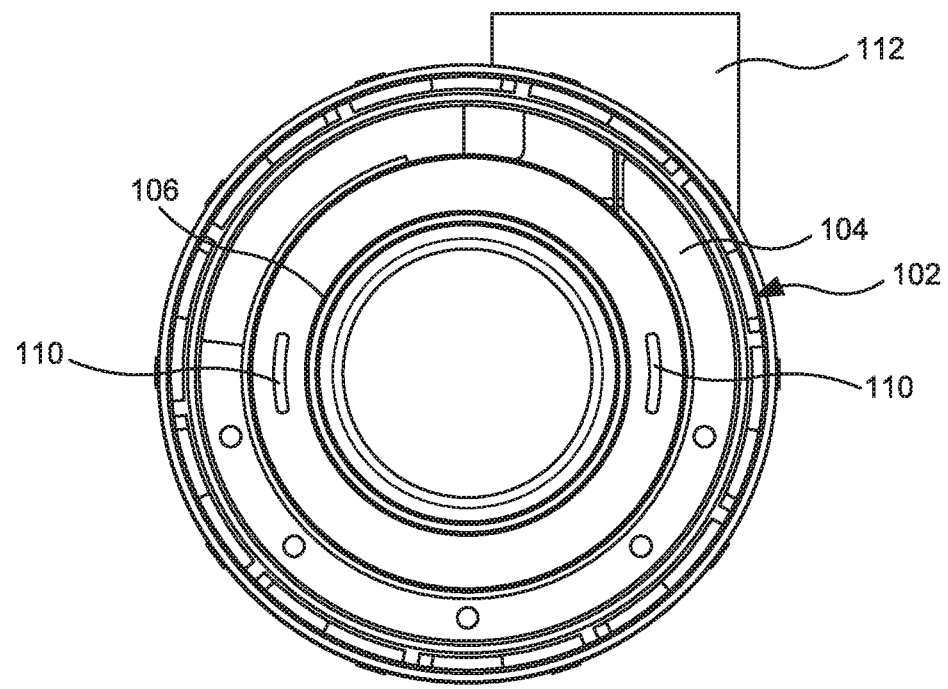
FIG. 2 is a bottom view of a housing of the filter assembly of FIG. 1, according to an embodiment.

FIG. 1 is a side cross-section view of a portion of a filter assembly 100, according to an embodiment. The filter assembly 100 comprises a housing 102 defining an internal volume within which a filter element 120 is positioned. The housing 102 includes an inlet 112 defined tangentially on a sidewall 103 of the housing 102 and configured to receive a fluid (e.g., air, air/fuel mixture, fuel, lubricant, etc.). The housing 102 may be cylindrical in shape with a circular cross-section as shown in FIGS. 1-2. In other embodiments, the housing 102 may have any suitable cross-sectional shapes, e.g., square, rectangular, elliptical, polygonal or other cross-sectional shapes.

The housing 102 includes a roof 104 coupled to an end of the sidewall 103 and defining an axial outlet 105. An outlet elbow 108 extends axially from an outer surface of the roof 104 away from the housing 102. An outlet tube 106 extends axially from an inner surface of the roof 104 into the housing 102.

Figure 3:
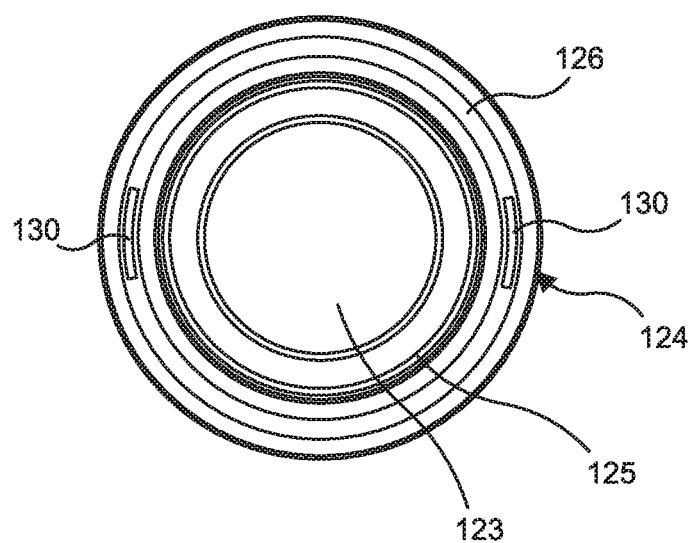
FIG. 3 is a top view of a filter element of the filter assembly of FIG. 1, according to an embodiment.
Figure 4:
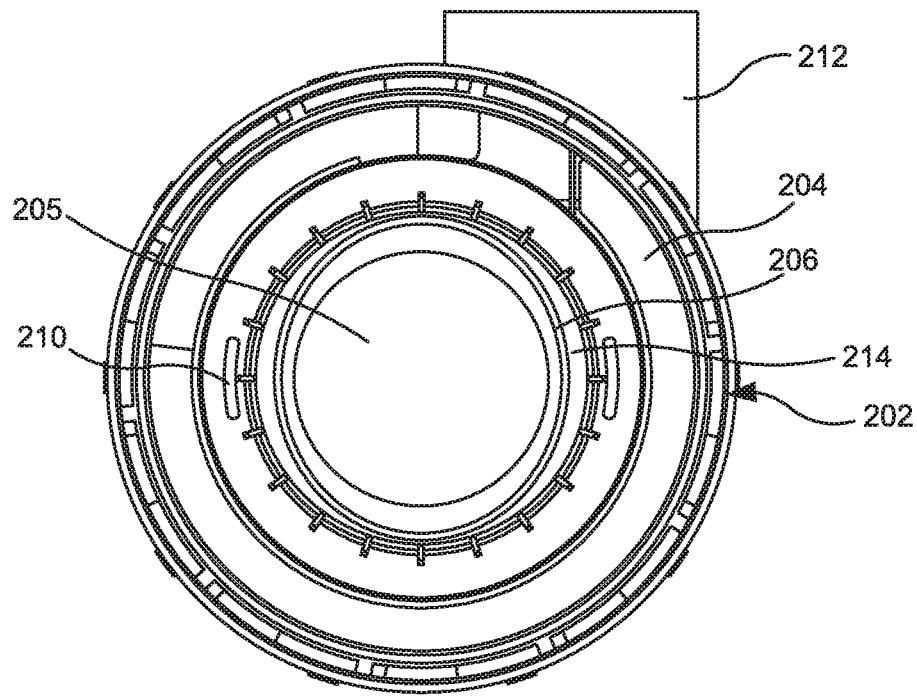
FIG. 4 is a bottom view of a housing for use in a filter assembly, according to another embodiment.
Figure 5:
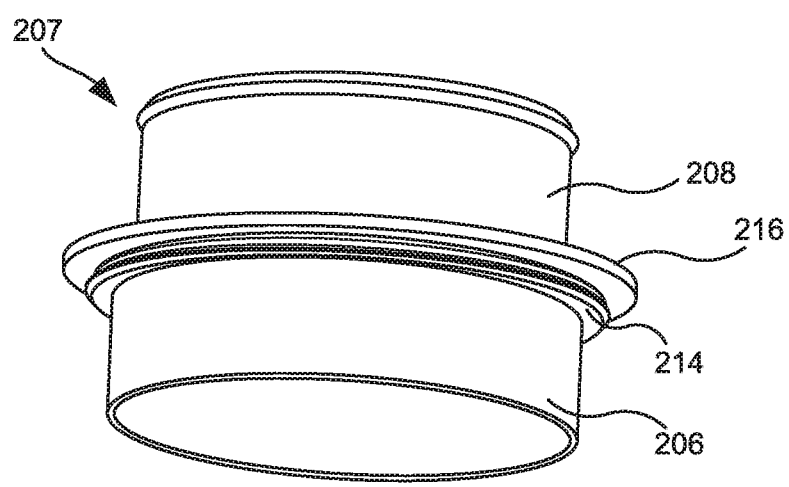
FIG. 5 is a perspective view of an outlet conduit configured to be coupled to the housing of FIG. 4, according to an embodiment.
Figure 6:
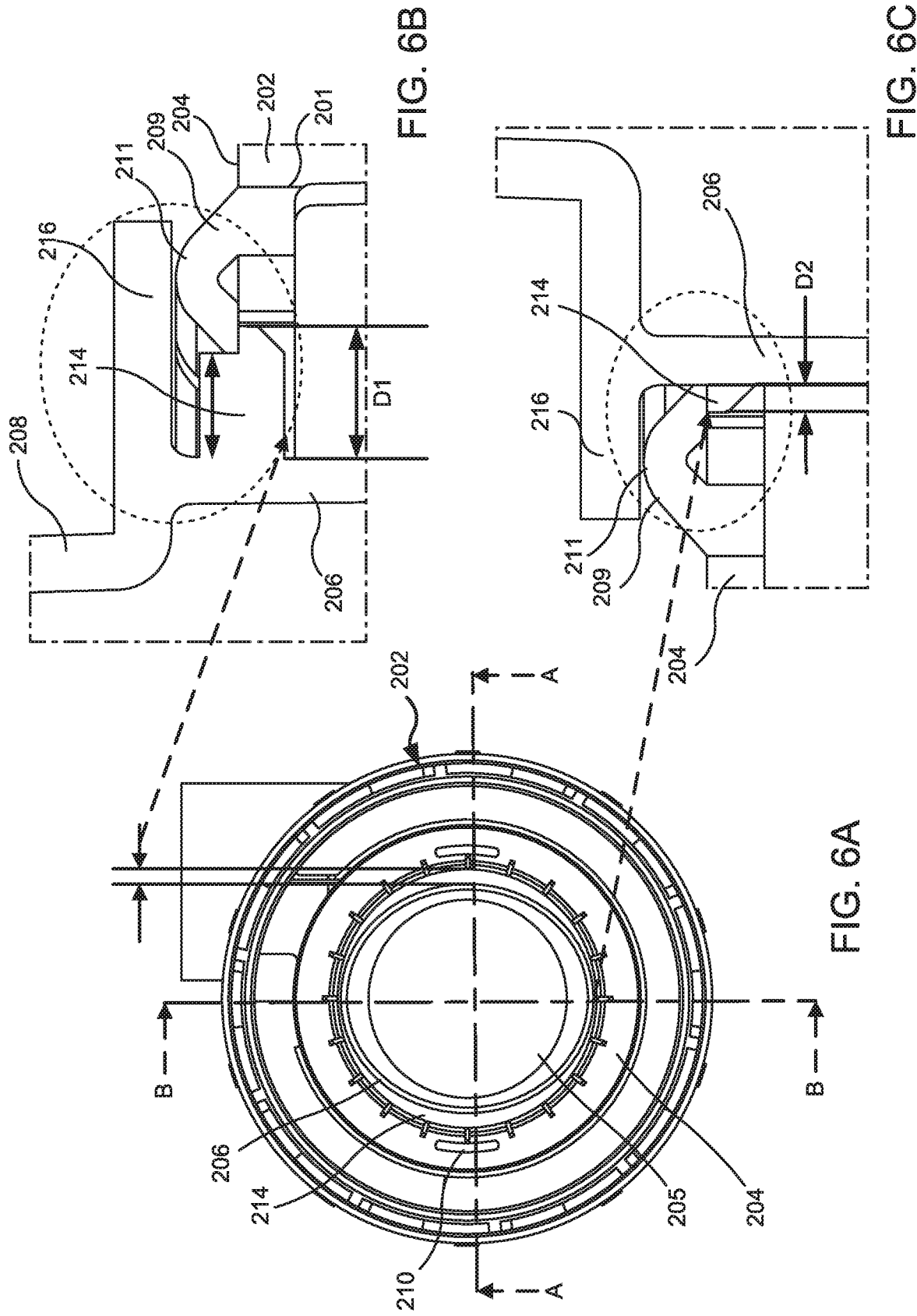
FIG. 6A is another bottom view of the housing of FIG. 4.
FIG. 6B is a first side cross-sectional view of the housing of FIG. 6A taken along the line A-A in FIG. 6A.
FIG. 6C is a second side cross-sectional view of the housing of FIG. 6A taken along the line B-B in FIG. 6A.

Referring also now to FIG. 3, a filter element 120 is positioned within the internal volume defined by the housing 102. The filter element 120 comprises a filter media 122 defining an axial channel 123 therethrough. The filter media 122 may be configured to filter fluid as it flows from a volume between an outer surface of the filter media 122 and the housing 102, radially through the filter media 122 into the channel 123 (e.g., a central channel). A first end cap 124 is coupled to a first end of the filter media proximate to the roof 104. The first end cap 124 defines a first end cap opening 125 having a diameter or cross-section corresponding to an outer diameter or cross-section of the outlet elbow 108 and configured to receive at least a portion of the outlet tube 106 therewithin, so that the outlet elbow 108 extends into the first end cap opening 125. The outlet tube 106 may form a fluid-tight seal with a rim of the first end cap opening 125 of the first end cap 124 so as to minimize leakage as the filtered fluid flows from the channel 123 through the outlet tube 106 and the outlet elbow 108 out of the housing 102. For example, an outer cross-sectional dimension (e.g., diameter) of the outlet tube 106 may correspond to an inner cross-sectional dimension (e.g., diameter) of the first end cap opening 125 so as to form a fluid tight seal with an inner radial surface of the first end cap opening 125.

The filter media 122 comprises a porous material having a predetermined pore size and is configured to filter particulate matter from the fluid flowing therethrough. In particular embodiments, the filter media 122 may comprise a cellulose sheet with a phenolic resin. In some embodiments, the filter media 122 or any other filter media described herein may include tetrahedral media, fluted filter media, corrugated filter media, straw media, or variations thereof. U.S. Pat. No. 8,397,920, entitled "PLEATED FILTER ELEMENT WITH TAPERING BEND LINES," by Moy et al., filed on Oct. 14, 2011, and issued on Mar. 19, 2013, assigned to Cummins Filtration IP Inc., which is incorporated by reference in its entirety and for all purposes, describes a tetrahedral filter media. Some configurations of tetrahedral filter media include a plurality of inlet tetrahedron flow channels and a plurality of outlet tetrahedron flow channels. The inlet tetrahedron merge in a central portion of the filter material thereby allowing axial cross-flow of air between the inlet tetrahedron channels prior to the air passing through the filter media. Such an arrangement provides for additional dust loading on the upstream side of the media, which increases filter capacity. In particular embodiments, the filter media 122 may include a pleated filter media.

In some embodiments, at least one lug may extend axially from the roof 104 into the internal volume defined by the housing 102, and the first end cap 124 may define at least one slot corresponding to the at least one lug and configured to receive a corresponding lug when the filter element 120 is disposed in housing 102. For example, as shown in FIGS. 1 and 2, a pair of lugs 110 extend axially from the roof 104 into the housing 102. The pair of lugs 110 are positioned opposite each other on either side of the outlet 105. The first end cap 124 defines corresponding slots 130 configured to receive the lugs 110. This may facilitate proper positioning of the filter element 120 within the housing as well as prevent positioning of a counterfeit filter element into the housing 102. In some embodiments, the first end cap 124 may be formed from a polymeric material, for example, polyurethane, and the slots 130 may be defined in the polymeric material. In other embodiments, a ring shaped member 126 may be embedded within the polymeric material, and the slots 130 defined within the ring shaped member 126.

Figure 7:
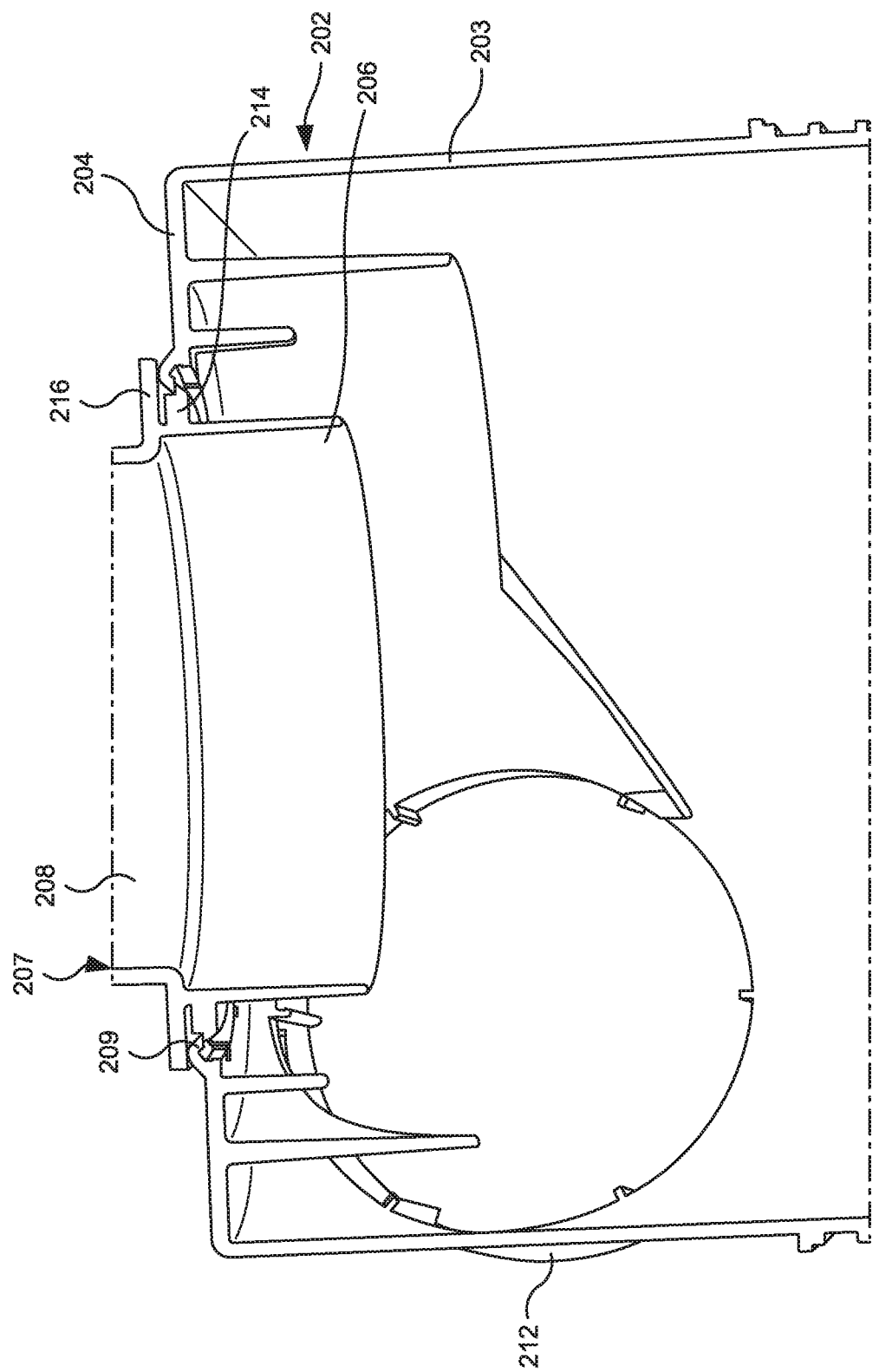
FIG. 7 is still another side cross-sectional view of the housing of FIG. 4.

In some embodiments, a housing of a filter assembly may include an outlet conduit including a non-circular outlet tube, and removably coupled to a housing of the filter assembly. Referring now to FIGS. 4-7, a housing 202 for a filter assembly (e.g., any of the filter assemblies described herein) is shown, according to an embodiment. The housing 202 comprises a roof 204 defining an outlet 205. The outlet 205 may define a circular cross-section. A housing ledge 209 extends radially inwards from an inner rim 201 of the outlet 205. In some embodiments, the housing ledge 209 may comprise an arch shaped member having an apex 211 positioned distal from the housing 202. The housing 202 also defines an inlet 212 defined tangentially on a sidewall 203 of the housing 202 that extends axially from the roof 204 (FIG. 7).

A pair of lugs 210 extend axially from the roof 204 of the housing 202 into an internal volume defined by the housing 202. The pair of lugs 210 are positioned opposite each other on either side of the outlet 205 and configured to be inserted into corresponding slots in a filter element (e.g., the slots 130 of the filter element 120), as previously described herein.

An outlet conduit 207 is coupled to the housing 202. The outlet conduit 207 comprises an outlet elbow 208 and an outlet tube 206 extending axially from the outlet tube 206 towards the housing 202. The outlet tube 206 may define an elliptical cross-section. The outlet tube 206 is configured to be positioned through the outlet 205 within the housing 202, and the outlet elbow 208 extends away from the housing 202. A rib 214 extends radially from an outer surface of the outlet tube 206 proximate to the outlet elbow 208, and is disposed circumferentially around the outlet tube 206. The rib 214 engages housing ledge 209 when the outlet tube 206 is positioned through the outlet 205 so as to couple, for example, snap-fit the outlet tube 206 to the outlet 205. In some embodiments, the outlet 205 has a circular shape, and an outer periphery of the rib 214 also defines a circular shape corresponding to the shape of the outlet 205.

The outlet conduit 207 may also include a circumferential flange 216 extending radially outwards from the outlet elbow 208 proximate to the outlet tube 206, or from an interface of the outlet elbow 208 and the outlet tube 206. The flange 216 may have a radial length longer than a radial length of the rib 214. The flange 216 may be configured to serve as a stopper to limit an insertion distance of the outlet tube 206 into the housing 202 through the outlet 205. For example, once the rib 214 traverses past the housing ledge 209, the flange 216 may contact a surface of the housing ledge 209 opposite the surface to which the rib 214 is snap-fit. Thus, the housing ledge 209 may be positioned between the rib 214 and the flange 216. In this manner, the flange 216 may prevent further insertion of the outlet elbow 208 into the housing 202, as well as secure the outlet conduit 207 to the housing 202 cooperatively with the rib 214. In some embodiments, the flange 216 may be configured to contact the housing ledge opposite the rib 214 (e.g., the apex 211 of the housing ledge 209) so as to form an axial seal with the housing ledge 209.

In some embodiments, a first end cap opening (e.g., the first end cap opening 125) of a first end cap (e.g., the first end cap 124) of a filter element (e.g., the filter element 120) disposed in the housing 202 defines a first non-circular shape. In such embodiments, the outlet tube 206 also defines a second non-circular cross-sectional shape corresponding to first non-circular shape. In some embodiments, each of the first non-circular shape and the second non-circular cross-sectional shape may comprise an ellipse. For example, As shown in FIGS. 6A-6C, the outlet tube 206 defines an elliptical cross-section. However, an outer periphery of the rib 214 defines a circular cross-section such that a first distance D1 between an outer surface of the outlet tube 206 and an outer edge of the rib 214 at a major axis of the ellipse defined by the outlet tube 206 is larger than a second distance D2 between the outer surface of the outlet tube 206 and the outer edge of the rib 214 at a minor axis of the ellipse. Thus, the outlet tube 206 may be positioned through the outlet 205 at any angular orientation with respect to the outlet 205. This may simplify assembly of the filter assembly and reduce manufacturing costs.

Figure 8:
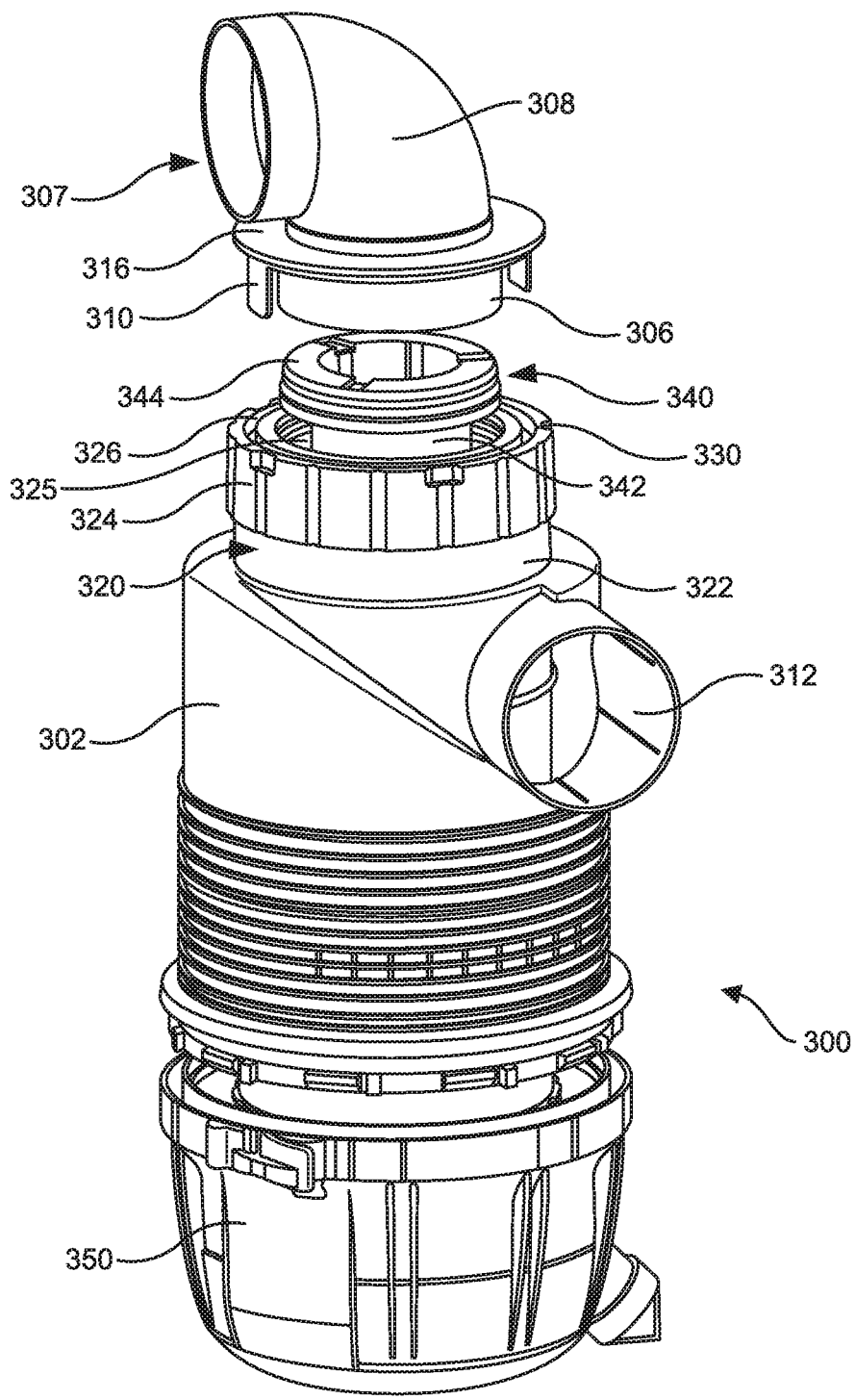
FIG. 8 is an exploded view of a filter assembly, according to an embodiment.
Figure 9B:
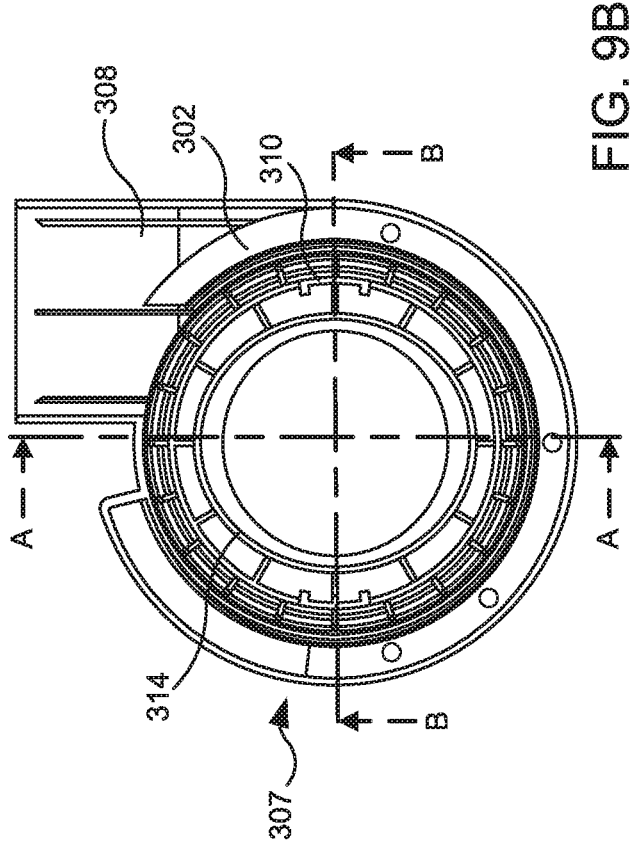
FIG. 9B is a bottom view of the housing of FIG. 8 with the outlet conduit coupled thereto.
Figure 9A:
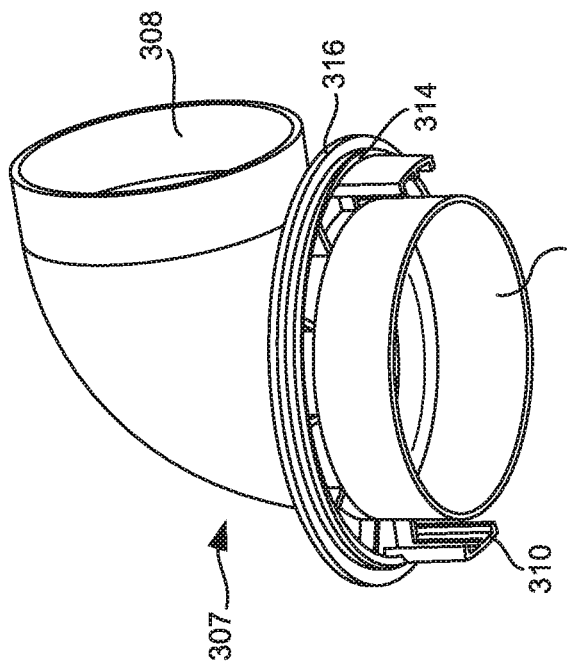
FIG. 9A is a perspective view of an outlet conduit of the filter assembly of FIG. 8.
Figure 9D:
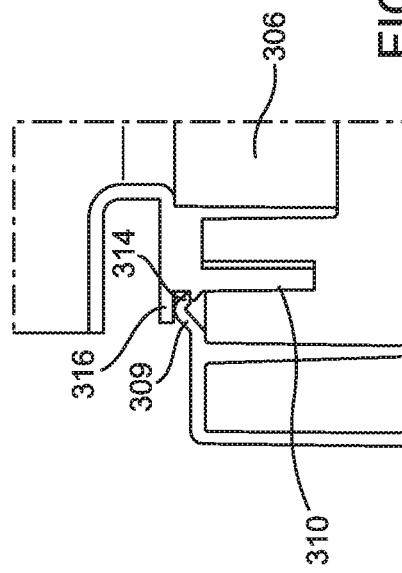
FIG. 9D is a second side cross-sectional view of the housing of FIG. 9B taken along the line B-B in FIG. 9A.
Figure 9C:
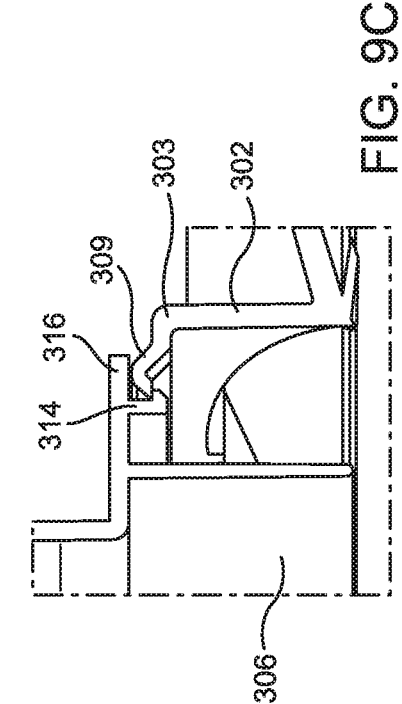
FIG. 9C is a first side cross-sectional view of the housing of FIG. 9B taken along the line A-A in FIG. 9A.

FIG. 8 is an exploded view of filter assembly 300, according to an embodiment. The filter assembly 300 includes a housing 302 defining an inlet 312, and a housing base 303 coupled to a first end of the housing 302. A primary filter element 320 is positioned within an internal volume of the housing 302. The primary filter element 320 includes a primary filter media 322 and a first end cap 324 coupled to the primary filter media 322 distal from the housing base 350. The first end cap 324 defines a non-circular first end cap opening 325 (e.g., an elliptical opening) as previously described herein A secondary filter element 340 is positioned within an axial channel defined through the primary filter element 320, and may serve as safety filter to remove any particles that may remain in the fluid after being filtered by the filter element 320. The secondary filter element 340 comprises a secondary filter media 342 disposed within the axial channel, and a secondary filter media end cap 344 coupled to the secondary filter media 342.

Referring also now to FIGS. 9A-D, an outlet conduit 307 is coupled to the housing 302. The outlet conduit 307 includes an outlet tube 306 extending towards the housing 302 and structure to be disposed within the first end cap opening 325, and an outlet elbow 308 extending away from the housing 302. The outlet tube 306 has an elliptical cross-section. A circumferential flange 316 extends radially from near an interface of the outlet tube 306 and the outlet elbow 308. A pair of lugs 310 extend axially from the flange 316 towards the housing 302. A rib 314 also extends axially from the flange 316 towards the housing 302 and is configured to engage a housing ledge 309 extending inwards from a rim 303 of an opening defined in the housing 302, so as to snap-fit the outlet conduit 307 to the housing 302, as previously described herein. The secondary filter media end cap 344 is disposed within the first end cap opening 325 radially inwards of the outlet tube 306. In some embodiments, the secondary filter media end cap 344 may have an outer cross-sectional shape corresponding to the second non-circular shape of the outlet tube 306.

Figure 10A:
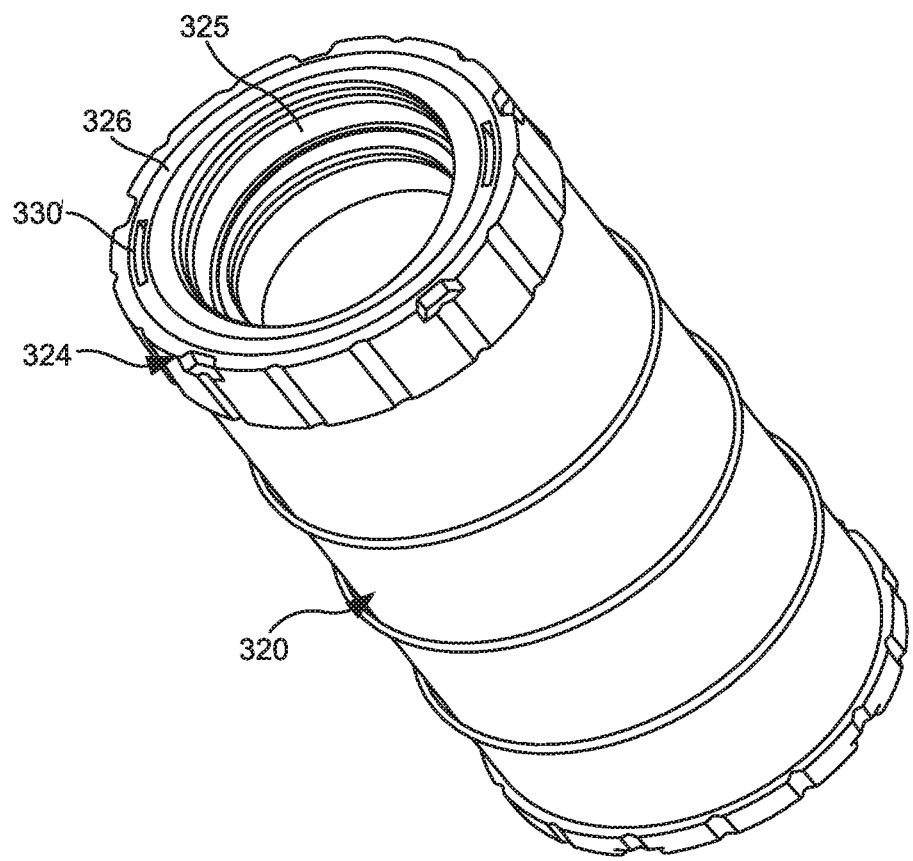
FIG. 10A is a perspective view and FIG. 10B is a top view of a filter element included in the filter assembly of FIG. 8, according to an embodiment.
Figure 10B:
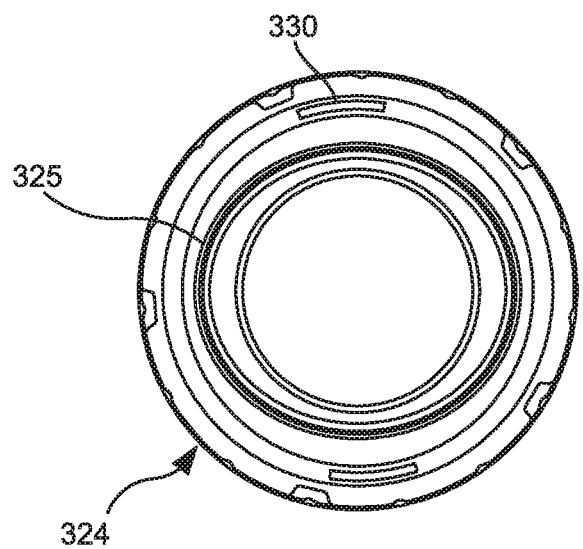

FIG. 10A is a perspective view, and FIG. 10B is a top view of the filter element 320. A pair of slots 330 are defined in the first end cap 324 of the filter element 320 and correspond to the pair of lugs 310 extending form the flange 316 towards the filter element 320. In some embodiments, the first end cap 324 may be formed from a polymeric material (e.g. polyurethane) having a ring 326 (e.g., a plastic or metal ring) embedded therein (e.g., during a molding process of the first end cap 324). The slots 330 may be defined in the ring 326.

Figure 11:
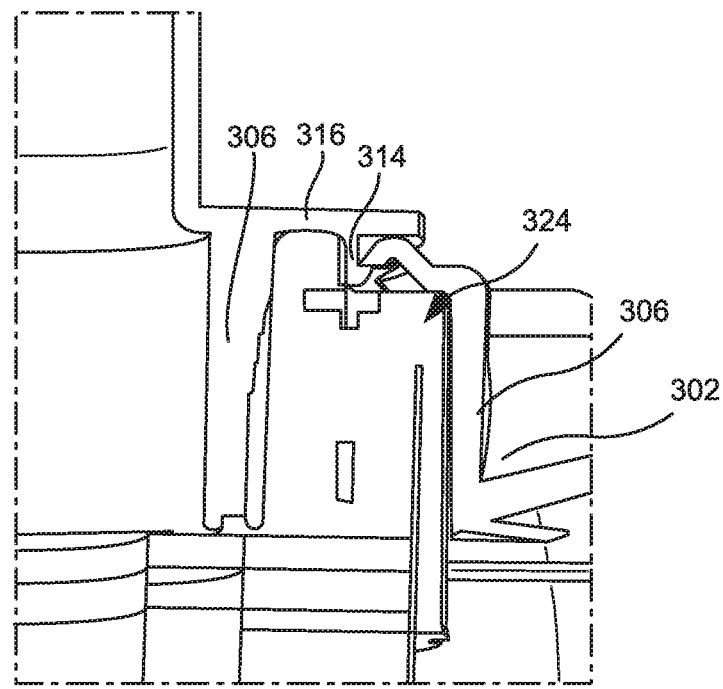
FIG. 11 is a side cross-section view of a portion of the outlet conduit of the filter assembly of FIG. 8 coupled to an end cap of the filter element of FIGS. 10A-B.

FIG. 11 is a side cross-section view of a portion of the outlet conduit 307 coupled to the first end cap 324. The first end cap 324 is positioned between the outlet tube 306, a sidewall of the housing 302, a lower surface of the flange 316 facing the first end cap 324, and an inner surface of the rib 314. In this manner, the first end cap 324 forms primarily radial seals with the outlet tube 306 and the inner surface of the rib 314, and also forms a primarily axial seal with the lower surface of the flange 316.

Figure 12:
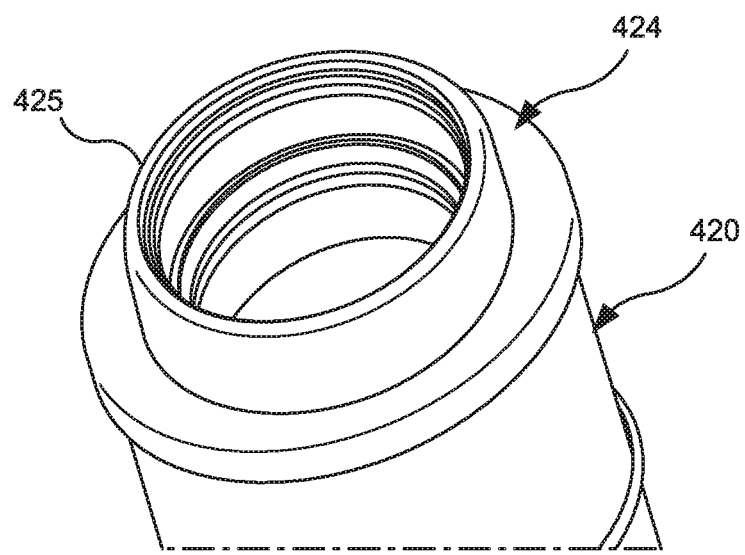
FIG. 12 is a top perspective view of an end cap of a filter element, according to another embodiment.
Figure 13A:
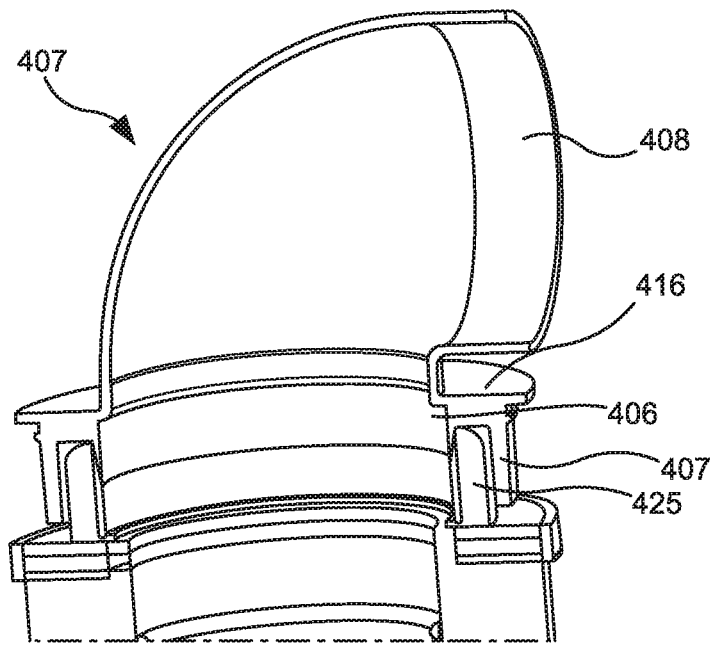
FIGS. 13A-B are cross-section views of an outlet conduit coupled to the end cap of the FIG. 12.
Figure 13B:
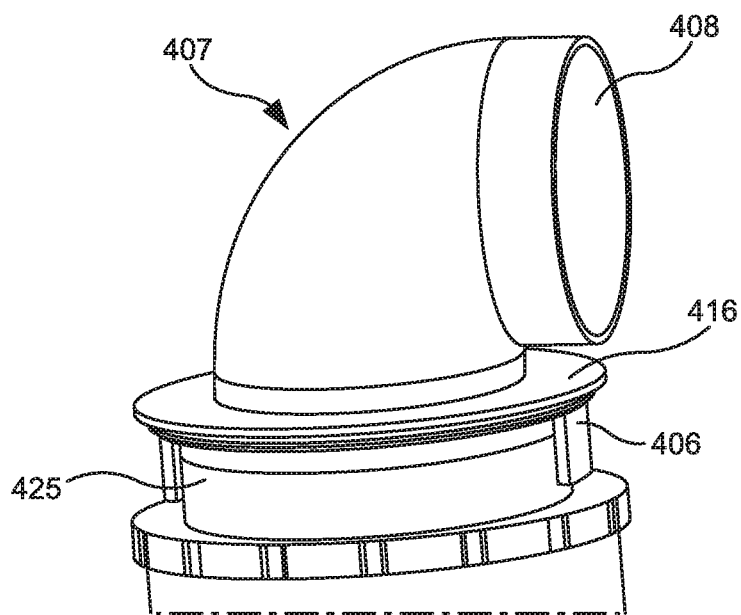

Referring also now to FIGS. 12-13B, FIG. 12 is a top perspective view of an end cap 424 of a filter element 420, according to another embodiment. The end cap 424 includes a coupling member 425 projecting from a first surface of the end cap 424 towards an outlet conduit 407. FIGS. 13A-B are cross-section views of the outlet conduit 407 coupled to the end cap 424. The outlet conduit 407 includes an outlet elbow 408 and an outlet tube 406 extending from a flange 416 towards the filter element 420. The outlet conduit 407 also includes an outer rib 409 extending axially from the flange 416 towards the filter element 420, and positioned radially outwards from the outer rib 409. The coupling member 425 is configured to be positioned between the outlet tube 406 and the outer rib 409 and is secured therewithin, for example, via a friction fit so as to form an axial seal with the flange 416, and a radial seal with an outer surface of the outlet tube 406.

Figure 14:
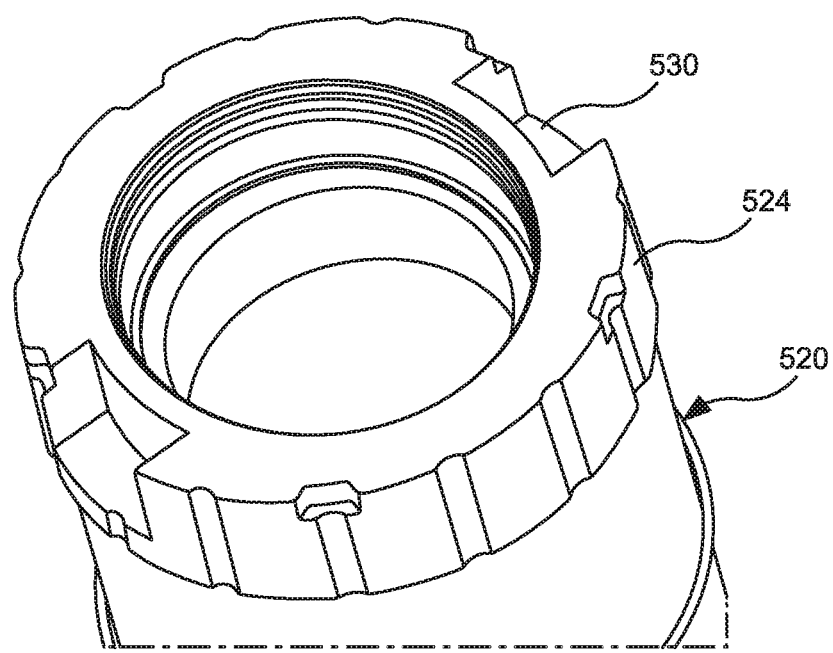
FIG. 14 is a perspective view of a filter element, according to yet another embodiment.

FIG. 14 is a perspective view of a filter element 520, according to yet another embodiment. The filter element 520 comprises a filter media 522 and an end cap 524. A pair of notches 530 are defined in the end cap 524 configured to receive a pair of lugs (e.g., the lugs 110, 210, 310 or 410) extending from a roof of a housing of a filter assembly or from an outlet conduit towards the filter element 520, as previously described herein.

Figure 15A:
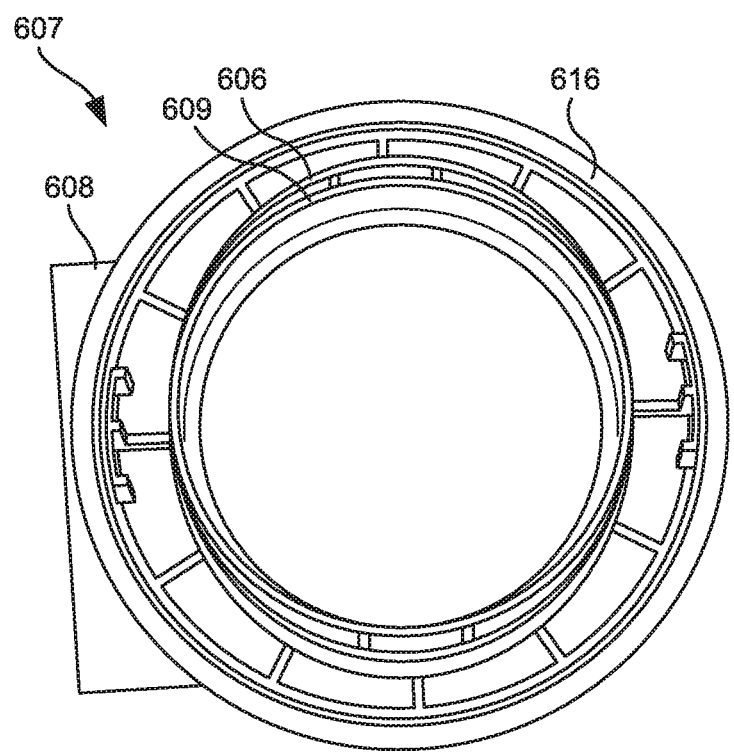
FIG. 15A is a bottom view of an outlet conduit, according to still another embodiment.
Figure 15B:
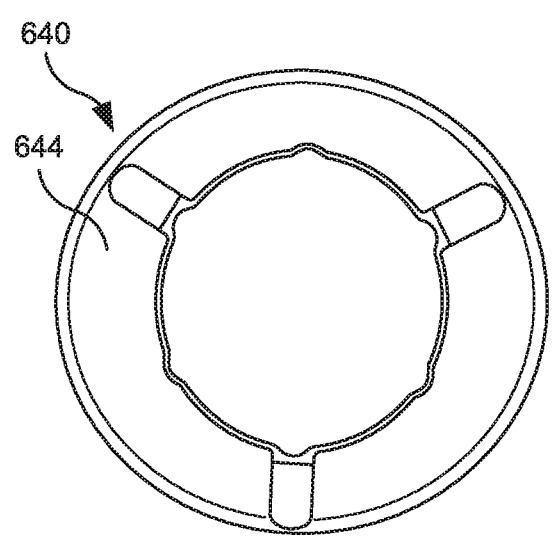
FIG. 15B is top view of a secondary filter element which may be positioned within a primary filter element and forms a seal with a surface of the outlet conduit of FIG. 15A.

FIG. 15A is a bottom view of an outlet conduit 607, according to still another embodiment. The outlet conduit 607 includes an outlet elbow 608. As shown in FIG. 15A, the outlet conduit 607 also includes an outer tube 606 extending axially from a radial flange 616 of the outlet conduit 607. The outer tube 606 has an elliptical cross-section and may be configured to interface with an elliptical opening defining in an end cap of a primary or outer filter media. The outlet conduit 607 also includes an inner tube 609 extending axially from the radial flange 616 and positioned radially inwards from the outer tube 606. The inner tube 609 defines a circular cross-section and is configured to engage a circular secondary filter media end cap of a secondary filter element, positioned within a primary filter element. For example, FIG. 15B is top view of a secondary filter element 640 which may be substantially similar to secondary filter element 340, previously described herein. The secondary filter element 640 may include a secondary filter media (e.g., the secondary filter media 642) having a secondary filter media end cap 644 coupled thereto. The secondary filter element 640 may be positioned within a primary filter element and the secondary filter media end cap 644 may be positioned within a first end cap opening of a first end cap of the primary filter media such that the inner tube 609 forms a seal with a radially outer surface of the secondary filter media end cap 644.

Figure 16A:
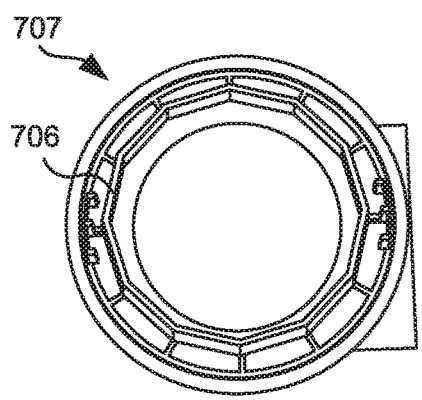
FIGS. 16A-F are various view of a various embodiments of outlet conduits.
Figure 16B:
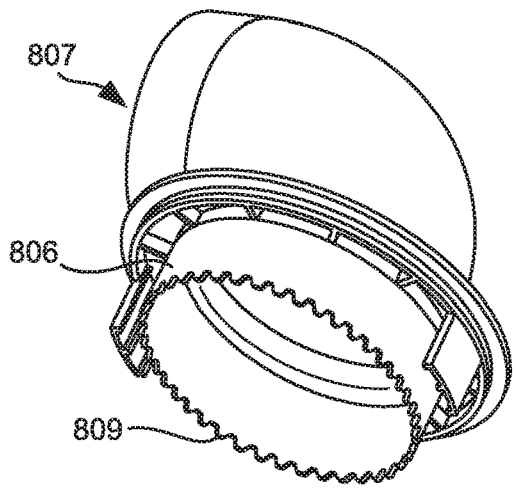
Figure 16C:
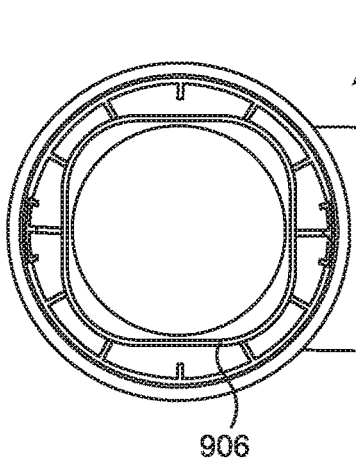
Figure 16D:
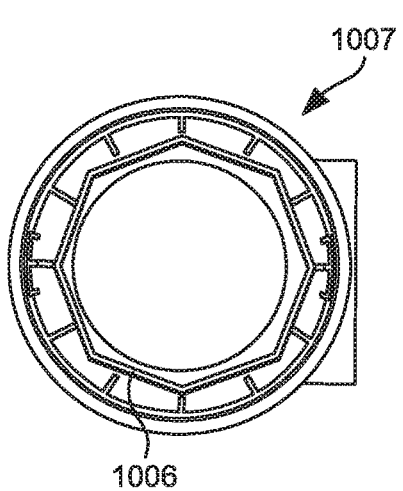
Figure 16E:
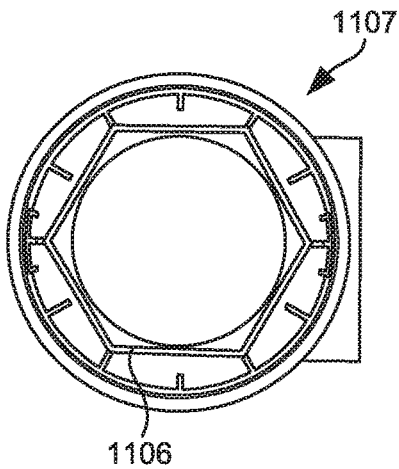
Figure 16F:
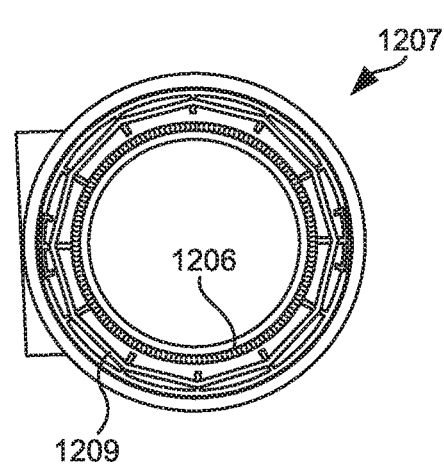

While various embodiments described herein include an outlet tube of an outlet conduit having an elliptical cross-section, in various embodiments, an outlet tube of an outlet conduit may have any other suitable non-circular cross-section. For example, FIG. 16A is a bottom view of an outlet conduit 707 that includes an outlet tube 706 having a dodecagonal cross-section, according to an embodiment. FIG. 16B is a bottom perspective view of an outlet conduit 807, according to another embodiment. The outlet conduit 807 includes an outlet tube 806 that includes a plurality of grooves defined on an axial edge of the outlet tube 806. FIG. 16C is a bottom view of an outlet conduit 907 that includes an outlet tube 806 having a square cross-section having rounded corners, according to yet another embodiment. FIG. 16D is a bottom view of an outlet conduit 1007 that includes an outlet tube 1006 defining an octagonal cross-section, according to still another embodiment. FIG. 16E is a bottom view of an outlet conduit 1107 that includes an outlet tube 1106 defining a hexagonal cross-section, according to yet another embodiment. FIG. 16F is a bottom view of an outlet conduit 1207 that includes a circular outlet tube 1206 circumscribed within a polygonal outer support tube, according to still another embodiment.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present application.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter assembly, comprising:
   a housing defining an internal volume and having one or more lugs extending into the internal volume, the housing defining an outlet, a housing ledge extending radially inwards from a rim of the outlet;
   an outlet conduit, comprising:
      an outlet elbow, and
      an outlet tube extending axially from the outlet elbow towards the housing, the outlet tube positioned within the housing and a rib extending radially from an outer surface of the outlet tube proximate to the outlet elbow, an outer periphery of the rib defining a circular shape corresponding to the outlet, the rib engaging the housing ledge so as to couple the outlet conduit to the housing; and
   a filter element positioned within the housing, the filter element comprising:
      a filter media defining an axial channel therethrough; and
      a first end cap coupled to a first end of the filter media proximate to the outlet, the first end cap defining a first end cap opening and one or more notches configured to receive the one or more lugs,
   wherein the outlet tube extends into the first end cap opening so as to be in fluid communication with the axial channel.

2. The filter assembly of claim 1, wherein the first end cap opening defines a first non-circular shape, and wherein the outlet tube defines a second non-circular cross-sectional shape corresponding to the first non-circular shape.

3. The filter assembly of claim 2, wherein each of the first non-circular shape and the second non-circular cross-sectional shape comprise an ellipse.

4. The filter assembly of claim 2, wherein an outer cross-sectional dimension of the outlet tube corresponds to an inner cross-sectional dimension of the first end cap opening such that the outlet tube forms a fluid tight seal with an inner radial surface of the first end cap opening.

5. The filter assembly of claim 2, wherein the rib is disposed circumferentially around the outlet tube.

6. The filter assembly of claim 1, wherein the filter element is a primary filter element, and wherein the filter assembly further comprises:
   a secondary filter element positioned within the axial channel defined by the primary filter element, the secondary filter element comprising:
      a secondary filter media disposed within the axial channel; and
      a secondary filter media end cap coupled to the secondary filter media, the second filter media end cap disposed within the opening defined by the first end cap radially inwards of the outlet tube.

7. The filter assembly of claim 1, wherein the outlet is defined axially in the housing, and wherein the housing further comprises an inlet defined tangentially on a sidewall of the housing.

8. The filter assembly of claim 1, wherein the outlet conduit further comprises a circumferential flange extending radially outwards from the outlet elbow proximate to the outlet tube, the flange configured to contact the housing ledge opposite the rib so as to form an axial seal with the housing ledge.

9. A filter assembly, comprising:
   a housing defining an internal volume, the housing defining an outlet, a housing ledge extending radially inwards from a rim of the outlet, wherein the housing comprises a roof within which the outlet is defined, at least one lug extending axially from the roof into the internal volume defined by the housing;
   an outlet conduit, comprising:
      an outlet elbow, and
      an outlet tube extending axially from the outlet elbow towards the housing, the outlet tube positioned within the housing, and a rib extending radially from an outer surface of the outlet tube proximate to the outlet elbow, the rib engaging the housing ledge so as to couple the outlet conduit to the housing; and
   a filter element positioned within the housing, the filter element comprising:
      a filter media defining an axial channel therethrough; and
      a first end cap coupled to a first end of the filter media proximate to the outlet, the first end cap defining a first end cap opening,
   wherein the outlet tube extends into the first end cap opening so as to be in fluid communication with the axial channel, and
   wherein the first end cap defines at least one slot corresponding to the at least one lug, the at least one lug inserted into the at least one slot when the filter element is positioned within the housing.

10. An outlet conduit for a filter assembly that comprises a housing defining an outlet in a roof thereof, a filter element disposed in the housing, the filter element including a filter media and a first end cap coupled to a first end of the filter media proximate to the roof, the first end cap defining a first end cap opening, the outlet conduit comprising:
   one or more lugs extending from the roof and configured to engage the first end cap of the filter element;
   an outlet elbow configured to extend away from the housing;
   an outlet tube extending axially away from the outlet elbow, the outlet tube configured to extend into the first end cap opening so as to be in fluid communication with an axial channel defined through the filter media, and
   a rib extending radially from an outer surface of the outlet tube proximate to the outlet elbow, an outer periphery of the rib defining a circular shape corresponding to the outlet, the rib configured to engage a housing ledge projecting radially inwards from a rim of the outlet so as to couple the outlet conduit to the housing.

11. The outlet conduit of claim 10, wherein the first end cap opening defines a first non-circular shape, and wherein the outlet tube defines a second non-circular cross-sectional shape corresponding to the first non-circular shape.

12. The outlet conduit of claim 11, wherein each of the first non-circular shape and the second non-circular cross-sectional shape comprise an ellipse.

13. The outlet conduit of claim 11, wherein an outer cross-sectional dimensional of the outlet tube corresponds to an inner cross-sectional dimension of the first end cap opening such that the outlet tube forms a fluid tight seal with an inner radial surface of the first end cap opening when the outlet conduit is coupled to the housing.

14. The outlet conduit of claim 11, wherein the rib is disposed circumferentially around the outlet tube.

15. The outlet conduit of claim 10, further comprising a circumferential flange extending radially outwards from the outlet elbow proximate to the outlet tube, the flange configured to contact the housing ledge opposite the rib so as to form an axial seal with the housing ledge.

\* \* \* \* \*